United States Patent
Seon (10) Patent No.: US 10,450,012 B2
(45) Date of Patent: Oct. 22, 2019

(54) REAR SPOILER FOR MUFFLER

(71) Applicants: Hyundai Motor Company, Seoul (KR); Kia Motors Corporation, Seoul (KR)

(72) Inventor: Jong-Ho Seon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 15/812,090

(22) Filed: Nov. 14, 2017

(65) Prior Publication Data
US 2019/0077469 A1    Mar. 14, 2019

(30) Foreign Application Priority Data
Sep. 8, 2017   (KR) .................. 10-2017-0114997

(51) Int. Cl.
| | |
|---|---|
| *B62D 35/00* | (2006.01) |
| *B62D 35/02* | (2006.01) |
| *F01N 13/08* | (2010.01) |
| *B62D 27/06* | (2006.01) |
| *B62D 27/04* | (2006.01) |
| *B62D 37/02* | (2006.01) |

(Continued)

(52) U.S. Cl.
CPC ........... *B62D 35/007* (2013.01); *B62D 27/04* (2013.01); *B62D 27/065* (2013.01); *B62D 35/02* (2013.01); *B62D 37/02* (2013.01); *F01N 1/00* (2013.01); *F01N 13/00* (2013.01); *F01N 13/08* (2013.01); *F01N 2260/00* (2013.01); *F01N 2340/04* (2013.01)

(58) Field of Classification Search
CPC .... B62D 35/007; B62D 27/04; B62D 27/065; B62D 35/02; F01N 13/08
USPC ..................... 296/180.1, 180.5, 180.4, 181.5
See application file for complete search history.

(56) References Cited

U.S. PATENT DOCUMENTS

| | | | |
|---|---|---|---|
| 6,438,949 B1 * | 8/2002 | Nozaki ................. | B60K 13/04 123/184.21 |
| 7,934,580 B2 * | 5/2011 | Van de Flier .......... | B60K 13/04 181/246 |

(Continued)

FOREIGN PATENT DOCUMENTS

| | | |
|---|---|---|
| JP | 2009-108824 A | 5/2009 |
| KR | 10-2008-0113403 | 12/2008 |

(Continued)

*Primary Examiner* — Jason S Morrow
*Assistant Examiner* — E Turner Hicks
(74) *Attorney, Agent, or Firm* — Mintz Levin Cohn Ferris Glovsky and Popeo, P.C.; Peter F. Corless (57) ABSTRACT

A rear spoiler for a muffler of a vehicle includes fixing units, mounted to a left side and a right side of the muffler, and locking units, formed at a left side and a right side of a spoiler body so as to be locked to the fixing units. Each of the locking units includes an elastic support portion, which has a fixing hook and a bolt hole formed below the fixing hook. Each of the fixing units also includes a bracket mounted to the muffler, a first hole through which the fixing hook passes, a second hole in which the fixing hook that has passed through the first hole is fitted, a bolt hole formed below the first and second holes, and a bolt fastened into the bolt hole formed in the bracket via the bolt hole formed in the elastic support portion.

2 Claims, 7 Drawing Sheets

(51) Int. Cl.
    *F01N 13/00*         (2010.01)
    *F01N 1/00*          (2006.01)

(56) References Cited

U.S. PATENT DOCUMENTS

| | | | |
|---|---|---|---|
| 7,946,380 B2 * | 5/2011 | Yamamoto | F01N 13/14 |
| | | | 181/204 |
| 8,602,158 B2 * | 12/2013 | Hayama | F01N 13/14 |
| | | | 181/212 |
| 9,188,052 B2 | 11/2015 | Tajima | |
| 9,441,512 B1 | 9/2016 | Collareno et al. | |
| 9,464,557 B2 * | 10/2016 | Hornby | F01N 13/00 |
| 9,758,201 B1 * | 9/2017 | Hwang | B62D 35/02 |
| 2002/0079162 A1 * | 6/2002 | Huff | B60K 13/04 |
| | | | 181/282 |
| 2006/0065480 A1 * | 3/2006 | Leehaug | F01N 13/14 |
| | | | 181/283 |
| 2008/0098721 A1 | 5/2008 | Liu | |
| 2011/0278881 A1 * | 11/2011 | Asai | B60K 13/04 |
| | | | 296/193.07 |

FOREIGN PATENT DOCUMENTS

| | | |
|---|---|---|
| KR | 10-2008-0113404 | 12/2008 |
| KR | 10-2009-0096693 | 9/2009 |
| KR | 10-1481369 | 1/2015 |

\* cited by examiner

REAR SPOILER FOR MUFFLER

CROSS-REFERENCE TO RELATED APPLICATION

This application claims under 35 U.S.C. § 119(a) the benefit of Korean Patent Application No. 10-2017-0114997, filed on Sep. 8, 2017 with the Korean Intellectual Property Office, the entire contents of which are incorporated herein by reference.

BACKGROUND

1. Technical Field

The present disclosure relates to a rear spoiler for a muffler, and more particularly, to a rear spoiler for a muffler, which may reduce flow loss at a rear end of a lateral-installation-type muffler, thereby improving straightness of airflow under a vehicle and consequently enhancing aerodynamic performance.

2. Description of the Related Art

In general, when a vehicle travels on a road at a high speed, a lift force is generated and is applied to the vehicle by air that flows along surfaces of the vehicle body, which may cause a rear end portion (i.e., a rear-wheel side) of the vehicle to be lifted. Therefore, in order to prevent this phenomenon, a rear spoiler is mounted to the rear end portion of the vehicle.

While the vehicle is traveling, a rear spoiler of a vehicle generates a down force in a downward direction due to an airflow speed difference created along an external surface of the rear spoiler, thereby improving the traveling stability of the vehicle.

Therefore, a vehicle equipped with the rear spoiler, which has optimized aerodynamic properties, may exhibit improved steering performance, stability and fuel efficiency. In particular, a rear spoiler is an important device for race cars.

Figure 1:
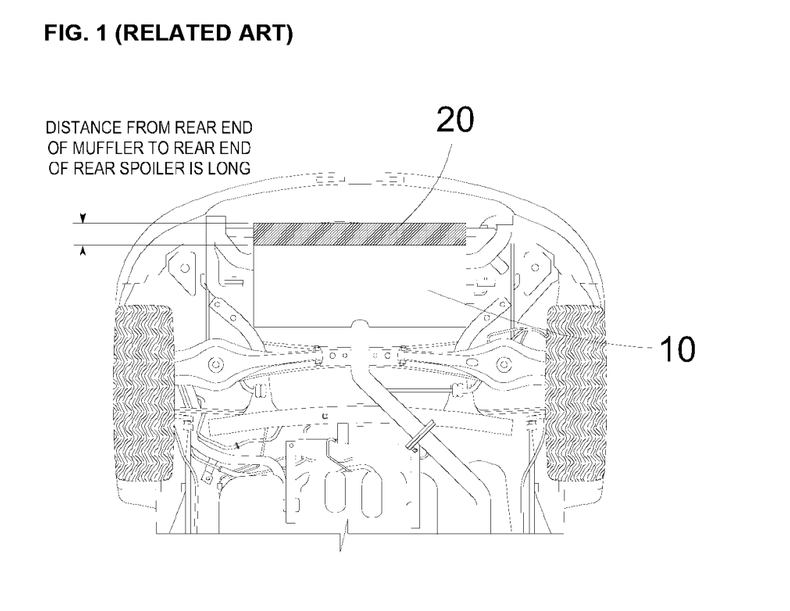
FIG. 1 (RELATED ART) is a bottom view illustrating the rear end portion of a vehicle to which a conventional rear spoiler is mounted.

As shown in FIG. 1 (RELATED ART), recently developed vehicles (for example, "i30" (product name), manufactured by Hyundai Motor Company) are configured such that a rear spoiler 20 is installed adjacent to a muffler 10.

Figure 2:
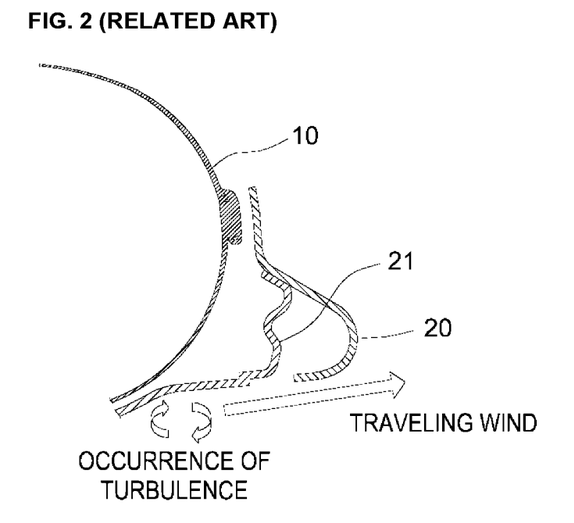
FIG. 2 (RELATED ART) is a partial sectional view schematically illustrating the structure in which the conventional spoiler is mounted to a muffler.

However, as shown in FIG. 2 (RELATED ART), because the distance from a rear end of the muffler 10 to a rear end of the rear spoiler 20 is long, traveling wind forms turbulence between the muffler 10 and the rear spoiler 20, deteriorating aerodynamic performance.

Figure 3:
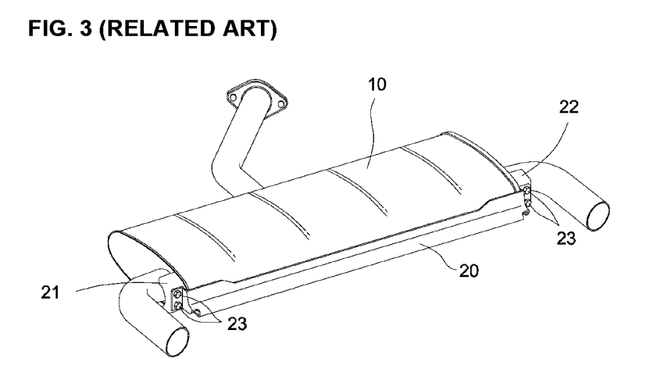
FIG. 3 (RELATED ART) is a perspective view illustrating the structure in which the conventional spoiler is mounted to the muffler.

Further, as shown in FIG. 3 (RELATED ART), the rear spoiler 20 requires a large number of sub-parts, increasing manufacturing time and costs.

In particular, the rear spoiler 20 requires left and right brackets 21 and 22 for enhancing rigidity and four bolts 23 for coupling the rear spoiler 20 to the left and right brackets 21 and 22.

Because these sub-parts are individually manufactured using press molds, the cost of equipment is high due to installation of different kinds of press molds.

In addition, since the rear spoiler has a cantilever structure, it is difficult to accurately adjust a gap between the muffler and the rear spoiler, which may cause a quality problem related to connection between the parts.

Further, because a four-bolt fastening structure is employed to ensure robustness, it is difficult to perform an assembly processes, such as welding of a reinforcement member, and working efficiency may be deteriorated.

SUMMARY

The present disclosure provides a rear spoiler for a muffler of a vehicle, which may reduce flow loss at a rear end of a lateral-installation-type muffler, thereby improving straightness of airflow under the vehicle and consequently enhancing aerodynamic performance, and which may minimize increases in manufacturing costs and weight thereof, thereby maximizing fuel efficiency.

In accordance with the present disclosure, the above and other objects can be accomplished by the provision of a rear spoiler for a muffler, including fixing units mounted to a left side and a right side of the muffler and locking units formed at a left side and a right side of a spoiler body of the rear spoiler so as to be locked to the fixing units.

Each of the locking units may include an elastic support portion, and the elastic support portion may include a fixing hook formed above a respective one of the left side and the right side of the spoiler body and a bolt hole formed below the fixing hook.

Each of the fixing units may include a bracket mounted to the muffler, a first hole formed in an upper portion of the bracket for passage of the fixing hook therethrough, a second hole for allowing the fixing hook that has passed through the first hole to be fitted therein, a bolt hole formed below the first hole and the second hole, and a bolt fastened into the bolt hole formed in the bracket via the bolt hole formed in the elastic support portion in order to securely mount the rear spoiler to the muffler.

BRIEF DESCRIPTION OF THE DRAWINGS

The above and other objects, features and other advantages of the present disclosure will be more clearly understood from the following detailed description taken in conjunction with the accompanying drawings, in which:

FIGS. 6A and 6B are views for comparing the size of a conventional bracket and a bracket according to the present disclosure, in which

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

Figure 4:
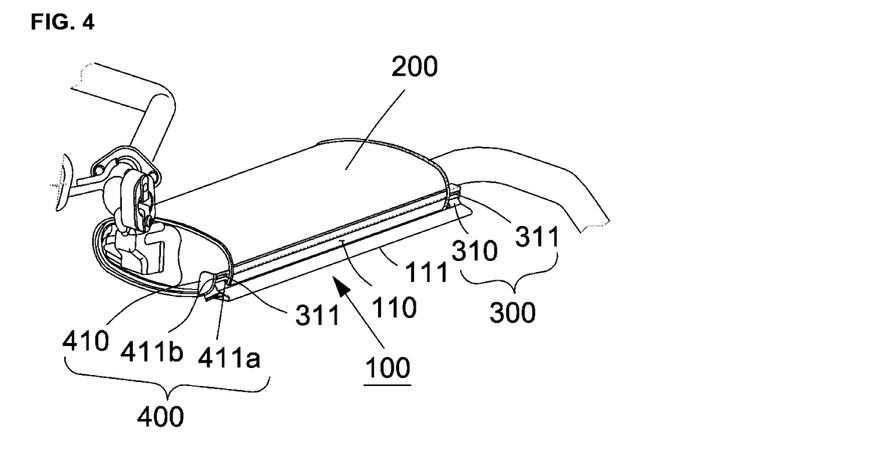
FIG. 4 is a view schematically illustrating a structure by which a rear spoiler according to the present disclosure is mounted to a muffler.
Figure 5:
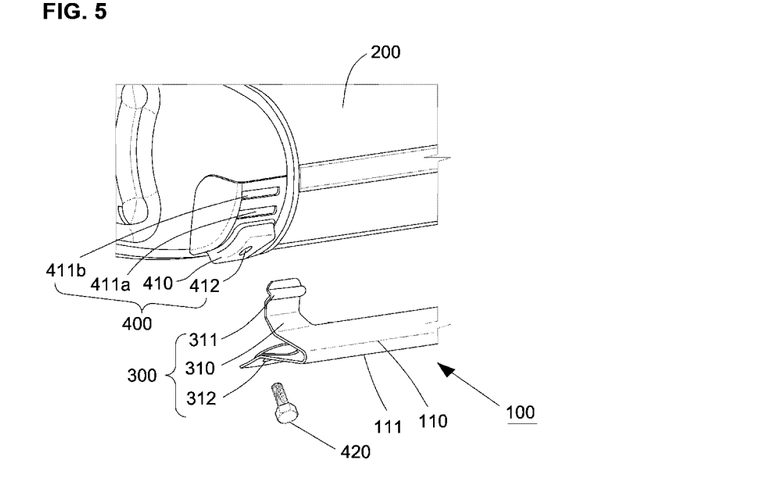
FIG. 5 is a view schematically illustrating a locking unit and a fixing unit for coupling the rear spoiler according to the present disclosure to the muffler.

As shown in FIGS. 4 and 5, a rear spoiler 100 of the present disclosure includes fixing units 400, which are mounted to a left side and a right side of a muffler 200, and locking units 300, which are formed at a left side a the right side of a spoiler body 110 and are locked to the fixing units 400.

Each of the locking units 300 is formed at a corresponding lateral side of the spoiler body 110 and includes an elastic support portion 310, which has a fixing hook 311 formed above the lateral side of the spoiler body 110 and a bolt hole 312 formed below the fixing hook 311.

In particular, the elastic support portion 310 is formed integrally with a respective one of the left side and the right side of the spoiler body 110, and the fixing hook 311 protrudes from the upper end portion of the elastic support portion 310.

Further, the bolt hole 312 is formed in the lower portion of the elastic support portion 310.

In addition, the spoiler body 110 has a curved protruding portion 111, which extends in the longitudinal direction of the muffler.

The curved protruding portion 111 is oriented in the outward direction from the muffler and is located at the lower portion of the muffler.

The above-described curved protruding portion 111, which extends in the longitudinal direction of the muffler, reduces flow loss at the rear end of the lateral-installation-type muffler, thereby improving straightness of airflow under the vehicle.

Figure 6A:
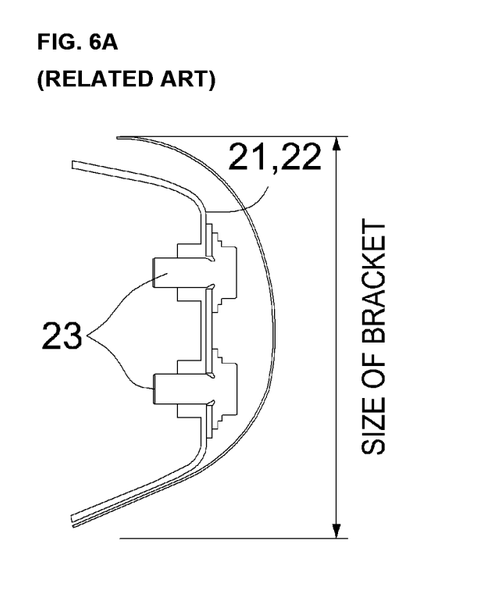
FIG. 6A illustrates a mounting state of a conventional bracket and FIG. 6B illustrates a mounting state of a bracket according to the present disclosure.
Figure 6B:
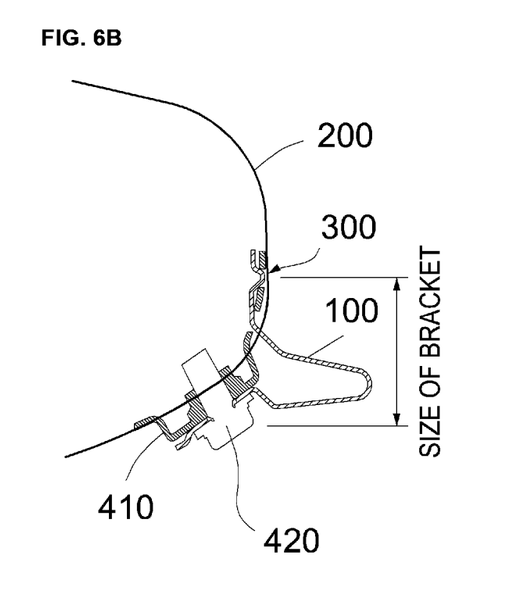

In addition, as shown in FIGS. 6A-6B, the elastic support portion 310, which is formed at a respective one of the left side and the right side of the spoiler body 110, has elastic force, by which the gap from the bracket is minimized.

Referring to FIG. 6A (RELATED ART), a conventional rear spoiler has a shortcoming in that the bracket is relatively large in order to ensure fastening area for two bolts, which are fastened to the bracket on each lateral side of the spoiler body of the conventional rear spoiler. In order to solve this problem, as shown in FIG. 6B, the present disclosure employs a single fixing hook 311, which is elastically deformable, and a single coupling bolt 430 at each lateral side of the spoiler body, thereby minimizing the size of the bracket and improving assembly efficiency.

Figure 8:
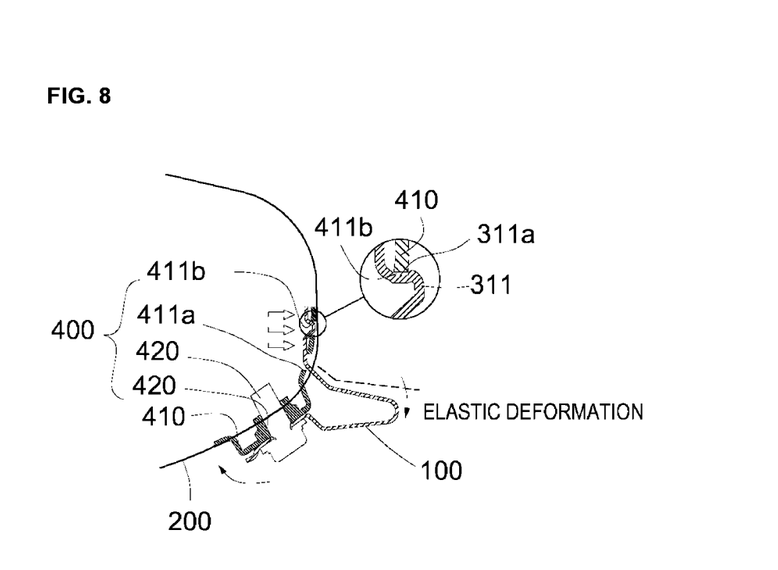
FIG. 8 is a sectional view showing the state in which the rear spoiler according to the present disclosure is mounted to the muffler.

In addition, each of the fixing units 400, as shown in FIG. 8, includes a bracket 410 mounted to the muffler, a first hole 411a formed in the upper portion of the bracket 410 for passage of the fixing hook 311 therethrough, a second hole 411b, in which the fixing hook 311 is fitted after passing through the first hole 411a, a bolt hole 412, which is formed below the first and second holes 411a and 411b, and a bolt 420, which is fastened into the bolt hole 412 formed in the bracket 410 via the bolt hole 312 formed in the elastic support portion 310 in order to securely mount the rear spoiler to the muffler.

The first and second holes 411a and 411b are formed in the shape of a long slot.

Figure 7:
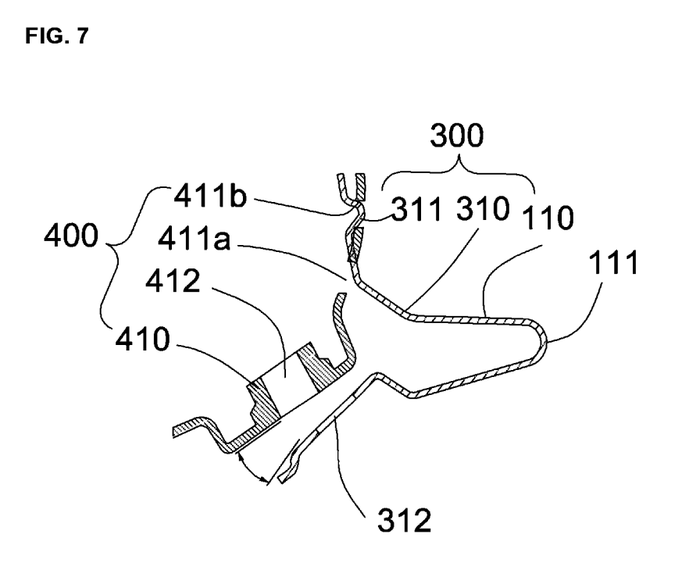
FIG. 7 is a view schematically showing the process of mounting the rear spoiler according to the present disclosure to the muffler.

Accordingly, the rear spoiler for a muffler, having the above construction, is installed as shown in FIG. 7.

First, the fixing hook 311 of the fixing unit 300, which is formed at a respective one of the left side and the right side of the spoiler body 110, passes through the first hole 411a formed in the bracket 410 and is temporarily fitted into the second hole 411b.

Subsequently, the bolt hole 312, which is formed in the installation surface (the surface of the lower portion of the elastic support portion 310) of the rear spoiler, is aligned with the bolt hole 412 formed in the bracket 410.

Subsequently, as shown in FIG. 8, the bolt 420 is fastened into the bolt hole 412, which is formed in the bracket 410, via the bolt hole 312 formed in the installation surface of the rear spoiler.

In addition, referring to an enlarged view showing the coupling structure of the fixing hook 311 in FIG. 8, the fixing hook 311 has a locking groove 311a, which is formed long in the longitudinal direction of the fixing hook 311, whereby the fixing hook 311 is more securely fitted into the second hole 411b formed in the bracket 410.

As is apparent from the above description, a rear spoiler for a muffler according to the present disclosure has the following effects.

First, the structure of the rear spoiler is made robust yet simple by eliminating a conventional bracket for reinforcing rigidity and by minimizing the number of bolts for fixing the rear spoiler to a muffler. Accordingly, the quality of the product is improved, increases in manufacturing costs and weight thereof are minimized, and the improvement in fuel efficiency is maximized.

Second, in order to remedy the shortcoming of a conventional rear spoiler, in which a bracket is relatively large in order to ensure fastening area for two bolts, which are fastened to the bracket on each lateral side of a spoiler body, the present disclosure employs a single fixing hook, which is elastically deformable, and a single coupling bolt at each lateral side of a spoiler body, thereby reducing the number of bolts (from four to two), minimizing the size of the bracket, and improving assembly efficiency.

Third, in order to remedy the shortcoming of a conventional rear spoiler having a cantilever structure, in which the distance from the coupling position of the upper end of the spoiler to the lower end thereof and the size of the spoiler are large, in which a reinforcement member is added, and in which adjustment of the gap between the muffler and the end of the spoiler is difficult, the present disclosure provides a compact structure in which the spoiler is fixed to the muffler merely by fastening a bolt only to the lower end portion of the spoiler body and the bracket, whereby the size of the upper end portion of the spoiler body is minimized, a reinforcement member is not required, and adjustment of the gap between the muffler and the end of the spoiler is easy.

Although the preferred embodiment of the present disclosure has been disclosed for illustrative purposes, those skilled in the art will appreciate that various modifications can be made without departing from the scope and spirit of the disclosure.

Therefore, the scope of the disclosure should be limited only by the accompanying claims and equivalents thereof. In other words, it should be understood that these embodiments are given by way of illustration only and do not limit the scope of the present disclosure, and that various modifications, additions and substitutions can be made without departing from the spirit and scope of the disclosure defined only by the accompanying claims and equivalents thereof.

What is claimed is:

1. A rear spoiler for a muffler installed to a vehicle, the rear spoiler comprising:
    fixing units mounted to opposite sides of the muffler; and
    locking units formed at opposite sides of a spoiler body of the rear spoiler so as to be locked to the fixing units, respectively,
    wherein each of the locking units includes an elastic support portion,
    wherein the elastic support portion includes a fixing hook formed above the spoiler body and a bolt hole formed below the fixing hook, and
    wherein each of the fixing units includes:
        a bracket mounted to the muffler;
        a first hole formed in an upper portion of the bracket for passage of the fixing hook therethrough;
        a second hole for allowing the fixing hook, having passed through the first hole, to be fitted therein;
        a bolt hole formed below the first hole and the second hole; and
        a bolt fastened into the bolt hole formed in the bracket via the bolt hole formed in the elastic support portion in order to securely mount the rear spoiler to the muffler.

2. The rear spoiler according to claim 1, wherein the rear spoiler is mounted to a lower portion of the muffler.

\* \* \* \* \*